United States Patent
Cave

(10) Patent No.: US 7,640,021 B2
(45) Date of Patent: Dec. 29, 2009

(54) METHOD AND APPARATUS FOR RADIO RESOURCE ALLOCATION IN A WIRELESS COMMUNICATION SYSTEM

(75) Inventor: Christopher Cave, Candiac (CA)

(73) Assignee: InterDigital Technology Corporation, Wilmington, DE (US)

(*) Notice: Subject to any disclaimer, the term of this patent is extended or adjusted under 35 U.S.C. 154(b) by 661 days.

(21) Appl. No.: 11/313,564

(22) Filed: Dec. 21, 2005

(65) Prior Publication Data
US 2007/0060156 A1 Mar. 15, 2007

Related U.S. Application Data

(60) Provisional application No. 60/716,430, filed on Sep. 13, 2005.

(51) Int. Cl.
*H04W 72/00* (2006.01)

(52) U.S. Cl. ........... 455/452.2; 455/434; 455/435.1; 455/435.2; 455/450; 455/451; 455/452.1; 455/455; 370/319; 370/322; 370/329; 370/341

(58) Field of Classification Search ......... 455/434, 455/435.1, 435.2, 455, 450, 451, 452.1, 452.2; 370/319, 322, 329, 341
See application file for complete search history.

(56) References Cited

U.S. PATENT DOCUMENTS

| | | | |
|---|---|---|---|
| 5,818,871 A * | 10/1998 | Blakeney et al. ........... 375/220 |
| 6,031,827 A * | 2/2000 | Rikkinen et al. ........... 370/330 |
| 6,631,122 B1 * | 10/2003 | Arunachalam et al. ...... 370/332 |
| 6,662,024 B2 * | 12/2003 | Walton et al. ........... 455/562.1 |
| 6,757,542 B2 * | 6/2004 | Bruin et al. ............... 455/453 |
| 7,020,105 B2 * | 3/2006 | Cooper .................... 370/321 |
| 7,257,083 B2 * | 8/2007 | Bansal et al. .............. 370/235 |
| 2002/0051424 A1 * | 5/2002 | Krishnamoorthy et al. .. 370/204 |
| 2004/0054798 A1 * | 3/2004 | Frank et al. ................ 709/229 |
| 2004/0132441 A1 | 7/2004 | Livet et al. |
| 2004/0190474 A1 | 9/2004 | Zhang |
| 2004/0203820 A1 * | 10/2004 | Billhartz ................ 455/452.1 |

FOREIGN PATENT DOCUMENTS

| | | |
|---|---|---|
| EP | 1 513 297 | 3/2005 |
| WO | 00/76244 | 12/2000 |
| WO | 2005/006150 | 1/2005 |

* cited by examiner

*Primary Examiner*—Stephen M D'Agosta
(74) *Attorney, Agent, or Firm*—Volpe and Koenig, P.C.

(57) ABSTRACT

A method and apparatus for re-allocating radio resources in a wireless communication system includes observing an original allocation of radio resources within the system. The method collects system statistics over an observation interval, determines an optimal allocation of radio resources based on the observed statistics, and re-allocates the radio resources based on the determination.

21 Claims, 3 Drawing Sheets

METHOD AND APPARATUS FOR RADIO RESOURCE ALLOCATION IN A WIRELESS COMMUNICATION SYSTEM

CROSS REFERENCED TO RELATED APPLICATIONS

This application claims the benefit of U.S. Provisional Application No. 60/716,430, filed on Sep. 13, 2005, which is incorporated by reference herein as if fully set forth.

FIELD OF INVENTION

The present invention relates to wireless communications. More particularly, the present invention relates to a method and apparatus for radio resource allocation in a wireless communication system.

BACKGROUND

Wireless communication systems employ various multiple access schemes in order to support the call load of multiple users. In such multiple access schemes, a number of radio resources or radio channels are available for communication between the Radio Access Network (RAN) and users. When a call is requested, radio resources are allocated from a pool of available resources for the duration of the call. When the call ends, the radio resources are re-inserted into the pool of available resources so that they may be allocated to other calls.

A Dynamic Channel Allocation (DCA) function is generally responsible for allocating radio resources when a call is requested. Sophisticated DCA methods determine an optimal allocation of resources amongst a set of available resources, such that certain system metrics are optimized. By way of example, typical system metrics include power consumption and interference.

When allocating system resources, the set of available resources for a particular request does not necessarily consist of all available system resources. For example, in Time Division Duplex (TDD) systems, a certain number of timeslots per frame are allocated for downlink (DL) transmission whereas the remainder are allocated for uplink (UL) transmission. In this case, DCA must restrict its choice for radio resources to DL timeslots for DL requests and to UL timeslots for UL requests. Similarly, a network operator might want to allocate radio resources for particular services. For example, in TDD systems, certain timeslots could be allocated for real time (RT) services whereas other timeslots could be allocated for non-real time (NRT) services.

In other types of wireless systems, the radio resources that are allocated for specific services could be frequency bands, channelization codes, timeslots, power units, and the like.

Ordinarily, radio resources cannot be straightforwardly divided between service types and direction because they have different requirements. Additionally, a number of characteristics are typically service-type and/or direction dependent. For instance, an offered load is the number of calls requested and the data rate of the requests. A call blocking rate is the rate at which call requests are blocked because radio resources are unavailable. A call dropping rate is the rate at which active calls prematurely end, such as due to a bad connection. User satisfaction is the percentage of users for which Quality of Service (QoS) requirements are met. QoS requirements include BLER (Block Error Rate), transmission delay and the like.

Data calls typically have a higher DL data rate than UL data rate. This is a result of the fact that user downloads typically far exceed uploads, causing a higher DL traffic load and asymmetric traffic. Similarly, RT calls typically have different QoS, call blocking and call dropping requirements than do NRT calls. Moreover, the radio resources to be allocated do not necessarily offer the same capacity to each service-direction combination. For example, in TDD systems, one timeslot might support more UL RT calls than DL RT calls, or vice versa. As a result, an operator cannot simply allocate twice as many timeslots for DL transmission if the DL offered load is twice the UL offered load.

Given these service-type and/or direction dependent requirements, determining the optimal allocation of available radio resources becomes a complex problem.

It would therefore be beneficial to determine an optimal allocation of radio resources without the limitations of the prior art.

SUMMARY

A method and apparatus for re-allocating radio resources in a wireless communication system includes observing an original allocation of radio resources within the system. The method collects system statistics over an observation interval, determines an optimal allocation of radio resources based on the observed statistics, and re-allocates the radio resources based on the determination.

BRIEF DESCRIPTION OF THE DRAWINGS

The foregoing summary, as well as the following detailed description of the preferred embodiments of the present invention will be better understood when read with reference to the appended drawings, wherein.

DETAILED DESCRIPTION OF THE PREFERRED EMBODIMENTS

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

The features of the present invention may be incorporated into an integrated circuit (IC) or be configured in a circuit comprising a multitude of interconnecting components.

Figure 1:
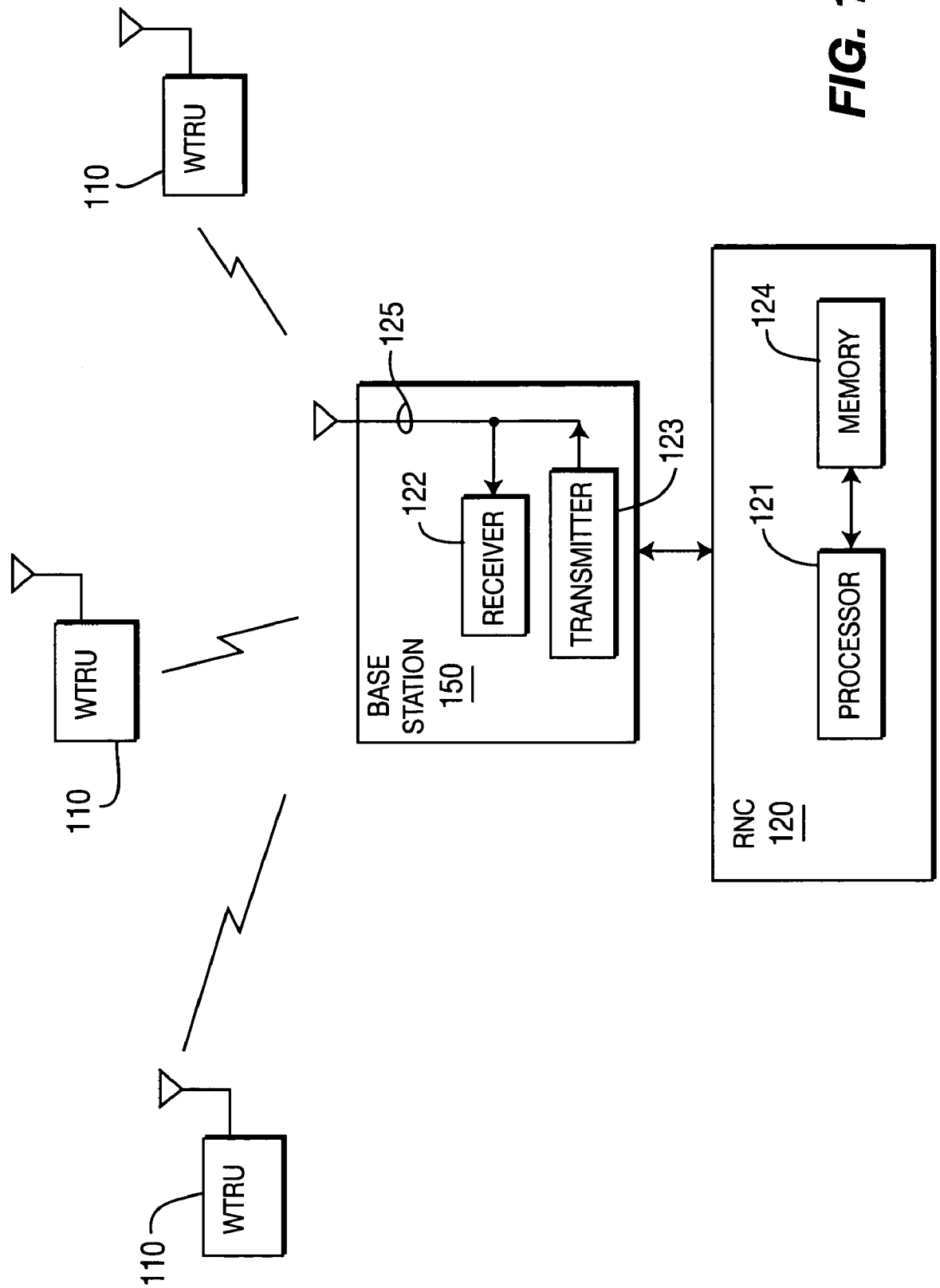
FIG. 1 is a block diagram of a wireless communication system configured in accordance with the present invention.

FIG. 1 is a block diagram of a wireless communication system 100 configured in accordance with the present invention. The wireless communication system 100 includes a plurality of WTRUs 110, a radio network controller (RNC) 120, and a base station 150, capable of wireless communication with one another.

The RNC 120 is configured to observe and re-allocate radio resources in the wireless communication system 100 in accordance with the present invention. The RNC 120 includes a processor 121 configured to observe and re-allocate radio resources in the wireless communication system 100, and a memory 124 in electrical communication with the processor 121.

The base station 150 includes a receiver 122 and a transmitter 123, both capable of communication with the RNC 120. The base station 150 also includes an antenna 125 in electrical communication with both the receiver 122 and the transmitter 123 to facilitate transmitting and receiving information wirelessly.

Figure 2:
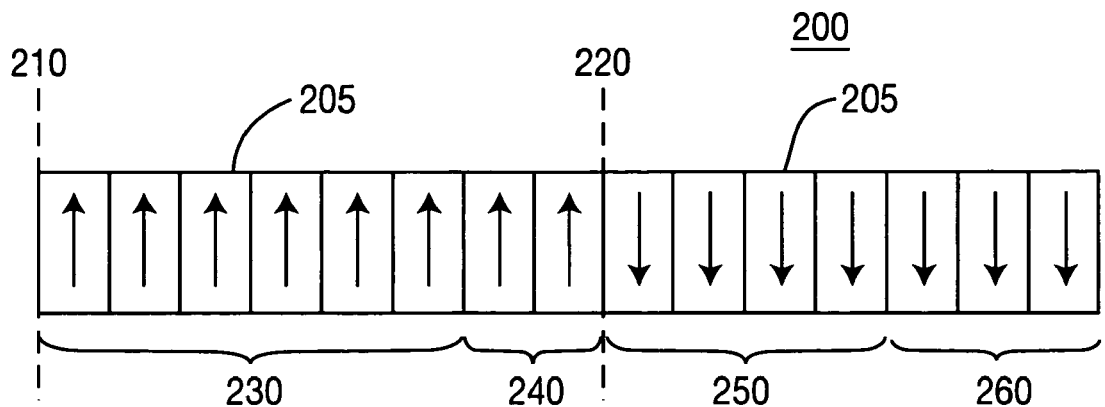
FIG. 2 is a representative radio frame structure prior to the allocation of timeslots.

FIG. 2 is a representative radio frame structure 200 in the wireless communication system 100. The radio frame structure 200 includes a plurality of radio resources 205, which serve radio transmission needs. In a typical time division duplex (TDD) system, where the radio resources are timeslots, a typical radio frame structure 200 includes 15 timeslots for transmission. As shown, a grouping of timeslots is originally allocated for the uplink direction for a first service (say S1) 230, the uplink direction for a second service (say S2) 240, the downlink direction for the first service 250, and the downlink direction for the second service 260. A downlink to uplink direction switching point 210 is provided prior to the first timeslot for uplink, and an uplink to downlink direction switching point 220 is provided prior to the first timeslot for downlink. By way of example, S1 may represent a real time (RT) service such as a voice communication service and S2 may represent a non-real time (NRT) service such as a data communication service, since it may be preferable to segregate RT and NRT timeslots in a TDD system.

Importantly, the original allocation of resources in FIG. 2 may not be the optimal allocation of resources for the radio frame structure 200. For example, FIG. 2 shows 6 timeslots allocated for S1-UL (230), 2 timeslots for S2-UL (240), 4 timeslots for S1-DL (250), and 3 timeslots for S2-DL (260). Accordingly, if more than 6 timeslots are required for S1-UL and less than 4 timeslots are required for S1-DL, then the radio frame 200 will not be optimally serving users requesting resources.

Figure 3:
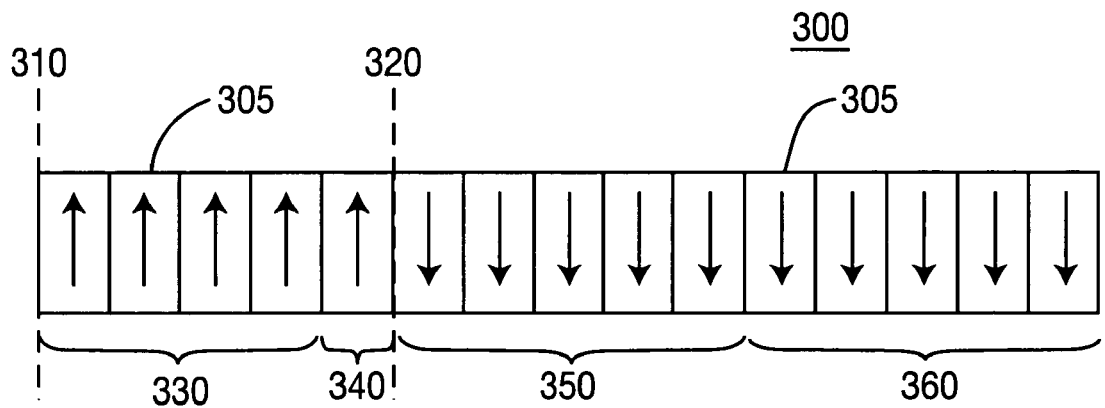
FIG. 3 is a modified radio frame structure after timeslots have been re-allocated.

FIG. 3 is a modified radio frame structure 300 after the RNC 120 has observed the radio frame structure 200 and re-allocated timeslots to optimally service user requests. The representative radio frame structure 300 depicted is only representative and it is to be noted that alternative allocations should be apparent to one of ordinary skill in the art.

In the present allocation of the modified radio structure 300, the radio frame structure 200 is modified to more effectively serve users requesting resources. For example, the original allocation of timeslots for S1-UL (230) was 6. In the present example, the processor 121 of the RNC 120 has determined that only 4 timeslots for S1-UL were needed (330). Additionally, in the original allocation for radio frame structure 200, the number of timeslots allocated for S2-UL (240) was 2. In the present example, the number of timeslots allocated for S2-UL is 1 (340). Whereas 4 timeslots were allocated for S1-DL (250) in the radio frame structure 200, the processor 121 of the RNC 120 has reallocated 5 timeslots for S1-DL (350), and 5 timeslots for S2-DL (260). Similarly to the radio frame structure 200, the modified radio frame structure 300 includes a DL-UL switching point 310 prior to the first timeslot, and a relocated UL-DL switching point 320.

The changes in allocation from the radio frame structure 200 to the modified radio frame structure 300 may be attributed to the statistics observed by the RNC 120, and the re-allocation of resources by the processor 121 of the RNC 120.

More particularly, using the example wherein S1 is a voice service and S2 is a data service, the modified radio frame structure 300 may reflect the needs of voice users and data users. That is, after the performance of the method 500 (shown in FIG. 5), it may have been determined that more timeslots were needed for downlink services (S1-DL and S2-DL) then uplink services, and that data uplink (S2-UL) required only one timeslot as opposed to data downlink (S2-DL) which required 5 timeslots. In a practical sense, this could be the result of higher downlink service use by a user than uplink use for data.

Figure 4:
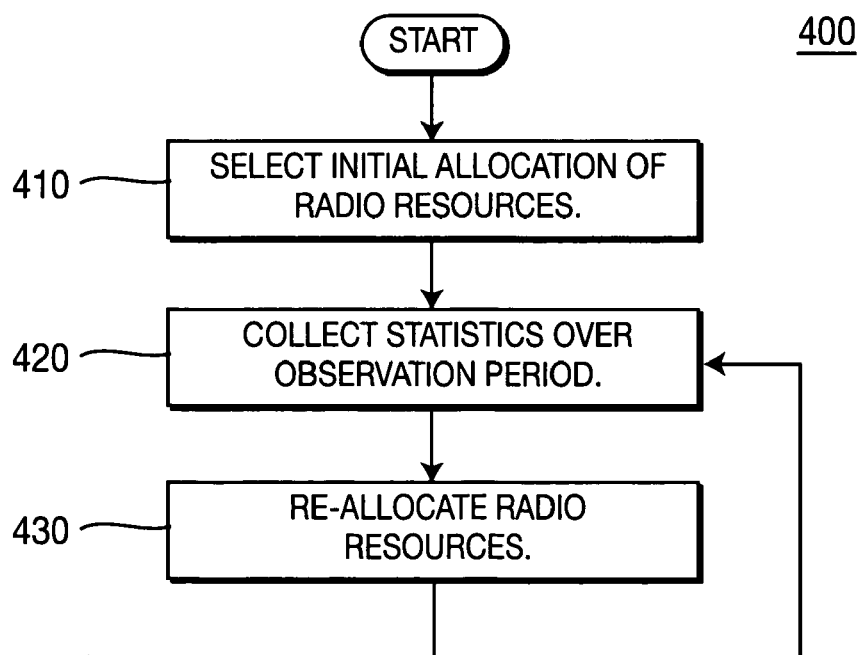
FIG. 4 is a flow diagram of a method of determining an optimal allocation of timeslots in a wireless communication system.

FIG. 4 is a flow diagram broadly showing a method of determining an optimal configuration of timeslots 400. In the present example, the method 400 observes and determines the configuration of timeslots for the two different services, S1 and S2, both in the UL and DL directions, and optimally re-allocates the timeslots.

In step 410, an initial allocation of radio resources is made to the wireless communication system 100. In a preferred embodiment of the present invention, a network operator allocates resources to each service as the network operator desires prior to observing the system in operation.

In step 420, statistics are collected for the wireless communication system 100 by observing the system for the period of time that the system operator chooses. This period might be one day, one week, several weeks, one month, several months, or any other time period known to one of ordinary skill in the art.

In a preferred embodiment of the present invention, the RNC 120 observes the wireless system 100 by receiving data about the system from the receiver 122 and antenna 125 of the base station 150. In a preferred embodiment of the present invention, statistics such as rejected resource units may be observed within the processor 121 of the RNC 120, while other statistics, such as dropped resource units are observed at the base station 150. The receiver 122 of the base station 150 transfers this data to the processor 121 of the RNC 120, which then stores all of the data about the present allocation in the memory 124 of the RNC 120 for later extraction.

In particular, to facilitate the re-allocation of resources, the following statistics are preferably observed and collected:

Rejected resource units (RUs) Q: Average number of new RU requests that are rejected per frame.

Dropped RUs D: Average number of RUs that are dropped per frame.

Served RUs S: Average number of RUs that are served per frame.

Offered Load O: The sum of Served RUs, Rejected RUs and Dropped RUs. That is:

$$O=Q+D+S.$$

The offered load O, therefore, is essentially all of the resource units that are requested by users, whether served or not served. Since either rejected or dropped RUs are effectively unserved units, the method of re-allocating resources will endeavor to limit the values of D and Q, while maximizing the value of S. Accordingly, in an optimal radio frame structure, it is desirable that all resource units be served resource units, so that users' communication needs are met.

Although the average number of RUs per frame is utilized as an input herein, the percentile of the number of RUs could be considered instead of averages. For example, the $95^{th}$ percentile of the number of RUs that are served per frame could be used rather than the average number of RUs that are served per frame. The percentile can be easily calculated from performance metrics Q, D, S and O extracted from the RNC 120. The individual service and direction statistics collected are then combined in order to obtain overall statistics per transmission direction (DL or UL) or per service type (S1 or S2). In a preferred embodiment of the present invention, the statistics are observed individually for each service and direction prior to re-allocating resources. For example, again referring to FIG. 2, the statistics are observed for the first service (S1) in both the downlink (DL) and uplink (UL) directions and for the second service (S2) in both the DL and UL directions. However, any number and type of services known to one of ordinary skill in the art may exist and be observed.

Based on the above collected statistics, the processor 121 can then determine the optimal allocation of timeslots within a radio frame for each service and direction and re-allocate the resources accordingly (step 430). Moreover, since the timeslot requirements for S1 and S2 may be significantly different, the re-allocation of timeslots should reflect those needs. For example, the network operator may wish to prioritize the needs of S1 above the needs of S2, or vice versa. This may be achieved during the re-allocation of timeslots by the introduction of a weighting constraint, which will be described in more detail below.

After re-allocating radio resources in step 430, the RNC continues to collect statistics over the observation period (step 420), and to re-allocate radio resources (step 430) as required.

Figure 5:
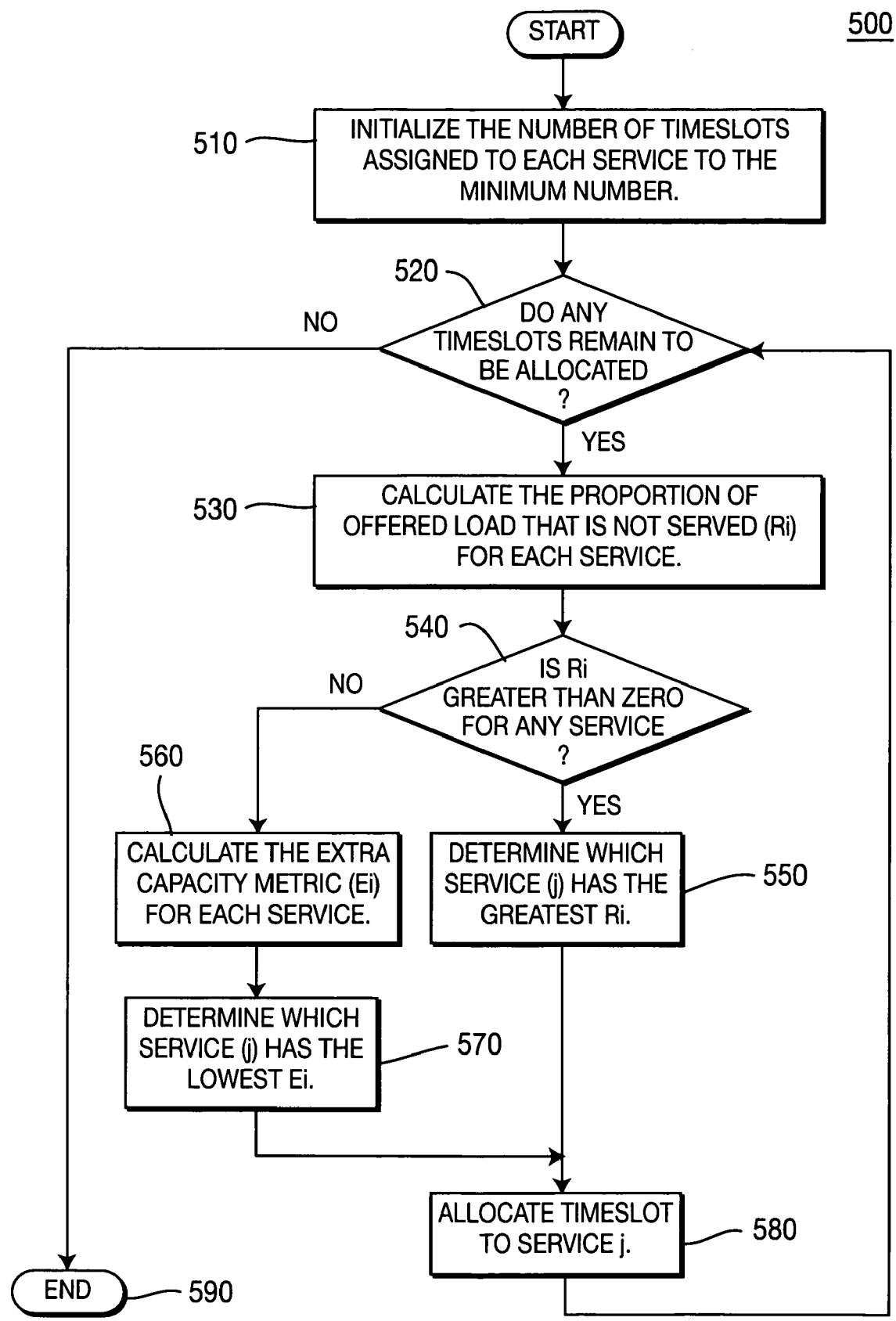
FIG. 5 is a flow diagram of a method of re-allocating timeslots in the wireless communication system of FIG. 1.

FIG. 5 is a flow diagram of a method of re-allocating timeslots 500 in the wireless communication system 100, in accordance with the present invention.

In step 510, the network operator initializes the number of timeslots assigned to each service to the minimum number. For example, in the wireless communication system 100 of the present example, there are 4 services. Therefore, if the network operator wished to ensure that at least one timeslot was allocated for each service i, the minimum number of timeslots $N_i^{MIN}$ might be set to 1. Accordingly, 1 timeslot initialized for each of the 4 services would ensure that 4 timeslots are allocated. Since a typical radio frame contains 15 total timeslots, this would generate 11 timeslots to re-allocate.

Notwithstanding the specific number of timeslots to re-allocate, given any number of timeslots N for dedicated channels, the re-allocation for $N_{S1-DL}$, $N_{S2-DL}$, $N_{S1-UL}$, and $N_{S2-UL}$ can be determined using the following constraint:

$$N = N_{S1-DL} + N_{S1-UL} + N_{S2-DL} + N_{S2-UL}.$$

That is, the total number of timeslots to be served (N) must take into account each different service, as well as each direction. In the present example, there are four services requiring timeslot re-allocation.

In order to simplify the service and direction combinations, an indexing notation may be considered, given by the following equation:

$$N = \sum_{i=1}^{NS} N_i$$

This notation utilizes the mapping between service-direction and index number i (representing a service/direction combination) that is given in Table 1. The variable $N_i$ represents the number of timeslots that are allocated for a service i, and the constant NS represents the number of services for which the total number of timeslots N are to be allocated. In the present example, NS=4 for service one/downlink (S1-DL), service one/uplink (S1-UL), service two/downlink (S2-DL), and service two/uplink (S2-DL). More particularly, i(1) represents S1-DL, i(2) represents S1-UL, i(3) represents S2-DL, and i(4) represents S2-UL.

TABLE 1

Mapping between index number and service type and direction

| i | Service Type and Direction |
|---|---|
| 1 | S1-DL |
| 2 | S1-UL |
| 3 | S2-DL |
| 4 | S2-UL |

In step 520, the processor 121 of the RNC 120 determines whether or not there are any timeslots for any service i that require allocating. If there are not, then the method 500 ends at step 590.

However, in the case where not enough timeslots have been assigned to a service i so as to serve its offered load, $O_i$, the proportion of the offered load that is not served per frame is calculated ($R_i$) (step 530). Therefore, $R_i$ represents the relative number of RUs that are rejected or dropped at each frame. This is calculated by dividing the offered load of service i per frame into the offered load of service i per frame minus the product of the configuration parameter $K_i$ and the number of timeslots that are allocated for the service i. The equation representing this instance is as follows:

$$R_i = \frac{O_i - K_i \times N_i}{O_i} = 1 - \frac{K_i \times N_i}{O_i}$$

In order to calculate the value of $R_i$, the following inputs and parameters need to be defined:

$N_i^{MIN}$: The minimum number of timeslots to be assigned for service i.

$N_i^{PREV}$: The previous number of timeslots that were allocated for service i.

$Q_i$: The average number of rejected RUs of service i per frame.

$S_i$: The average number of RUs of service i that are served per frame.

$O_i$: The offered load of service i per frame, which is the sum of observed served RUs, rejected RUs and dropped RUs statistics of service i.

$K_i$: The number of RUs of service type i that can be served in one timeslot.

The previous number of timeslots ($N_i^{PREV}$) for a service i is the number of timeslots that were allocated for that particular service in any previous iteration of the method 500. Again using the present example, if the network operator wished to begin by allocating at least one timeslot per service i, then $N_i^{MIN}$ should be equal to 1 for any service i at the start of the implementation of the method 500.

The configuration parameter $K_i$ then, is the number of RUs of service type i that can be served in one timeslot, and can be determined as follows. If the average number of rejected RUs of each service i per frame is greater than zero ($Q_i > 0$), then the offered load per frame for each service i is greater than the number of resources that were allocated for that service. That is, not enough resources were allocated to serve that particular service.

Therefore, in this scenario, the configuration parameter $K_i$ is set to the average number of RUs that were served per timeslot. This can be calculated by dividing the average number of RUs of the service i that are served per frame $S_i$ by the number of timeslots that were allocated for the service i ($N_i^{PREV}$) as demonstrated by the following equation:

$$K_i = \frac{S_i}{N_i^{PREV}}.$$

On the other hand, if the average number of rejected RUs of service i per frame is less than zero ($Q_i<0$), then the offered load per frame for service i is smaller than the number of resources that were allocated for service i. Accordingly, the average number of RUs of service i that are served per frame $S_i$ does not accurately represent the number of RUs of service i that can be served in one timeslot. Therefore, the parameter $K_i$ is set to a constant value that is provided by the network operator as an input, $K_i'$. The network operator can set the configuration parameter to a value he deems appropriate based on the observed statistics, or can use any other parameters known to one of ordinary skill in the art.

Here, $R_i$ corresponds to the probability that an offered RU is not served. This can be referred to as the non-served probability. The re-allocation in this case should therefore attempt to minimize $R_i$ for all services i.

For example, suppose that the offered load $O_i$ for a particular service i is 10 RUs, but only 2 timeslots were allocated ($N_i=2$), and it is observed that the system can handle 4 RUs per timeslot ($K_i=4$). In this example, the non-served probability $R_i$ would equal $^2/_{10}$ths, or 20%. Therefore, two out of the 10 RUs will go unserved.

If $R_i$ is greater than zero in step 540, then the method 500 determines the service i for which $R_i$ is the greatest (step 550) taking into account a weighting constraint defined as follows:

$\alpha_i \times R_i = \alpha_j \times R_j$ for all $i$ and $j$.

In this equation, $\alpha_i$ is used to prioritize between different services types and the weighted non-served probability of each service type should be equal in the final allocation. Additionally, the variable j is introduced as the service i for which the method 500 will allocate the timeslot. The weighting factors, $\alpha_i$ may be obtained by comparing the call rejection probability and call dropping probability requirements of each service. Higher priority service types should have higher values of $\alpha_i$. For example, voice services may be more critical to the network operator than data services. Therefore, the network operator may wish to place a greater weight toward assuring that resources are allocated for voice service than data service, notwithstanding data service needs. Additionally, the DL and UL of the same service should have the same call blocking and call dropping requirements. Referring again to Table 1, it can be seen that $\alpha_1=\alpha_2$ and $\alpha_3=\alpha_4$. Absolute values of $\alpha_i$ are not important, only relative values of $\alpha_i$ should be determined.

In step 550, the method 500 determines which service has the highest proportion of offered load that is not served, so as to determine which service will be allocated an additional timeslot. Therefore, a representative equation for the processor 121 to determine the service j for which to allocate the timeslot is:

$j=\arg_i \max(\alpha_i \times R_i)$

After determining which service j to allocate the timeslot to (step 550), the processor 121 allocates the timeslot in step 580 ($Nj=Nj+1$) and the method 500 returns to step 520 to determine whether or not any more timeslot exist to be allocated.

Moreover, in a TDD system, an integer number of timeslots must be assigned to each service and direction combination since it is not possible to allocate partial timeslots. Therefore, an integer-constrained optimization problem arises to allocate the timeslots. This can be solved, in a preferred embodiment of the present invention, by employing an iterative method for determining the allocation. That is, one timeslot is allocated in step 580 to a service j at each iteration of the method 500, ensuring that an integer number of timeslots is assigned to each service and direction combination.

If in step 540, the processor determines there are enough timeslots to serve the offered load of all i's, that is, where timeslots are abundant ($R_i \leq 0$), then the processor 121 calculates an extra capacity metric $E_i$ that is allocated to service i at each frame (step 560). This can be represented as the equation:

$$E_i = \frac{K_i \times N_i - O_i}{O_i} = \frac{K_i \times N_i}{O_i} - 1$$

$E_i$ corresponds, in this formula, to the ratio of the number of extra timeslots that are allocated for a service i to the offered load of the service i. When timeslots are abundant, the method of allocating should attempt to maximize $E_i$ for all services i.

In similar fashion to the case where timeslots are not abundant, a second weighting constraint can be defined as:

$\beta_i \times E_i = \beta_j \times E_j$ for all $i$ and $j$.

Again, the weighted extra capacity of each service type should be equal in the final allocation. The weighting factors, $\beta_i$, are obtained similarly to $\alpha_i$. Higher priority service types should have smaller values of $\beta_i$. Moreover, in the present example of S1 and S2, DL and UL, $\beta_1=\beta_2$ and $\beta_3=\beta_4$, as in the previous case. Once again, since the absolute values of $\beta_i$ are not important, only the relative values of $\beta_i$ should be determined.

In step 570, the method 500 determines which service has the lowest extra capacity metric, so as to determine which service to allocate an additional timeslot. Therefore, a representative equation for the processor 121 to determine the service j for which to allocate the timeslot is:

$j=\arg_i \min(\beta_i \times E_i)$

After determining which service j to allocate the timeslot to (step 570), the processor 121 allocates the timeslot in step 580 ($Nj=Nj+1$) and the method 500 returns to step 520 to determine whether or not any more timeslots exist to be allocated.

As previously described, the method of allocating timeslots 500 ends (step 590) once all of the timeslots are allocated.

The re-allocation of timeslots may be transmitted to the WTRUs 110 by the processor 121 of the RNC 120 through the transmitter 123 and the antenna 125 of the base station 150.

While the invention is described for TDD systems, where timeslots are the resources to be allocated, the invention may be implemented in any system that benefits from allocation of resources, including, but not limited to: FDD, TDSCDMA, OFDM, UMTS, CDMA, CDMA 2000. In a preferable example, according to a TDD system, timeslots are allocated for UL and DL transmission for two different services, defined as service one (S1) and service two (S2), although allocation can be performed for any number of services known to one of ordinary skill in the art. Similarly, it can be simplified to only allocating timeslots for UL and DL transmission, independently of the service type. The proposed method can also be adapted to other types of systems where codes, timeslots, power units, or any combination thereof are to be allocated.

The method can determine the allocation of resources for any cluster of cells in the network, ranging from one cell to the entire radio access network. The resulting configuration determined in the method should be applied to all cells within the cluster. To adequately perform the method of allocating resources, the system statistics should be collected for the entire cluster of cells over an extended period of time, prior to invoking the method, and should be averaged on a frame-basis over the entire observation interval. The observation interval can correspond to the time between two invocations of the method, or any other interval of time. For example, the method might only consider statistics observed during a peak congestion period in order to optimize the resource configuration for that period of time.

Although the features and elements of the present invention are described in the preferred embodiments in particular combinations, each feature or element can be used alone (without the other features and elements of the preferred embodiments) or in various combinations with or without other features and elements of the present invention. For example, in a preferred embodiment of the present invention, the methods of observing and re-allocating resources are described as being performed by a processor, preferably with an application running on the processor to perform the methods. However, any method known to one of ordinary skill in the art may be utilized to perform the method of observing and allocating resources in the wireless communication system. For example, the features of the present invention may be incorporated into an integrated circuit (IC) or be configured in a circuit comprising a multitude of interconnecting components. Additionally, the method of observing and re-allocating resources is applicable to the application layer of wireless systems; and may be implemented as software or middleware.

What is claimed is:

1. A method for allocating radio resources in a wireless communication by a radio network controller (RNC), the method comprising:
    assigning by the RNC an initial allocation of timeslots for a first service and for a first direction of a second service;
    observing by the RNC an original allocation of radio resources;
    collecting by the RNC statistics over an observation interval, wherein the collecting includes observing a previous number of timeslots that were reserved for each of the first and second services, an average number of resource units not served, and an average number of resource units served;
    determining by the RNC whether any timeslots remain to be allocated;
    determining by the RNC an optimal allocation of timeslots by calculating an offered load as the sum of the average number of resource units not served and the average number of resource units served;
    calculating by the RNC the average number of resource units that can be served in one timeslot; and
    re-allocating by the RNC radio resources based on the determining of the optimal allocation.

2. The method of claim 1, wherein the timeslots are allocated for a first direction of the first service.

3. The method of claim 2, wherein the timeslots are allocated for a second direction of the second service.

4. The method of claim 1, wherein the number of resource units that can be served on one timeslot is the previous number of timeslots that were reserved divided into the average number of resource units served.

5. The method of claim 1, further comprising calculating a proportion of offered load that is not served for the first and second services.

6. The method of claim 5, wherein the proportion of offered load that is not served is greater than zero.

7. The method of claim 6 further comprising determining which service has the greatest proportion of offered load not served.

8. The method of claim 7 further comprising using a weighting factor to determine which service has the greatest proportion of offered load not served.

9. The method of claim 6 further comprising allocating an additional timeslot to the service which has the greatest proportion of offered load not served.

10. The method of claim 5, wherein the proportion of offered load not served is less than or equal to zero.

11. The method of claim 10 further comprising calculating an extra capacity for each service.

12. The method of claim 11 further comprising determining which service has the lowest extra capacity.

13. The method of claim 12 further comprising using a weighting factor to determine which service has the lowest extra capacity.

14. The method of claim 12 further comprising allocating an additional timeslot to the service which has the lowest extra capacity.

15. The method of claim 1, wherein the determining the optimal allocation of timeslots is performed periodically over a pre-determined time period.

16. The method of claim 15, wherein the time period is one day.

17. The method of claim 15, wherein the time period is one week.

18. The method of claim 15, wherein the time period is one month.

19. The method of claim 1, wherein determining the optimal allocation of radio resources is performed at a specific time.

20. A radio network controller (RNC) comprising:
    a memory; and
    a processor in communication with the memory, the processor configured to:
    assign an initial allocation of timeslots for a first service and for a first direction of a second service;
    observe an original allocation of radio resources;
    determine whether any timeslots remain to be allocated;
    observe resource statistics communicated from a base station, wherein a previous number of timeslots that were reserved for each of the first and second services, an average number of resource units not served, and an average number of resource units served are observed;
    determine an optimal allocation of radio resources by calculating an offered load as the sum of the average number of resource units not served and the average number of resource units served;
    calculate the number of resources units that can be served in one timeslot; and
    re-allocate radio resources to a plurality of wireless transmit/receive units (WTRUs).

21. The RNC of claim 20, wherein the processor stores the observed resource statistics in the memory of the RNC.

* * * * *

UNITED STATES PATENT AND TRADEMARK OFFICE
CERTIFICATE OF CORRECTION

PATENT NO.      : 7,640,021 B2                                              Page 1 of 1
APPLICATION NO. : 11/313564
DATED           : December 29, 2009
INVENTOR(S)     : Christopher Cave It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 857 days.

Signed and Sealed this

Ninth Day of November, 2010

David J. Kappos
*Director of the United States Patent and Trademark Office*